United States Patent Office 3,634,459
Patented Jan. 11, 1972

3,634,459
EPIPODOPHYLLOTOXIN DERIVATIVES
Albert von Wartburg, Max Kuhn, and Jany Renz, Basel, Switzerland, assignors to Sandoz Ltd. (also known as Sandoz AG), Basel, Switzerland
No Drawing. Continuation-in-part of application Ser. No. 477,601, Aug. 5, 1965. This application June 18, 1969, Ser. No. 834,551
Claims priority, application Switzerland, Aug. 12, 1964, 10,509/64; June 4, 1965, 7,888/65; Mar. 15, 1967, 3,986/67
Int. Cl. C07d 21/00
U.S. Cl. 260—340.5
2 Claims

ABSTRACT OF THE DISCLOSURE

The invention concerns the intermediate compound, 4′-demethyl-epipodophyllotoxin of the Formula I,

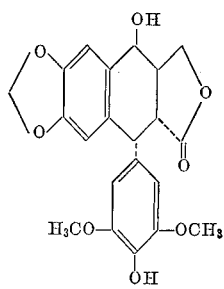

The intermediate is useful for the preparation of useful epipodophyllotoxin derivates to which the invention extends. The said epipodophyllotoxin derivatives are useful because they possess cytostatic activity.

A process for the production 4′-demethyl-epipodophyllotoxin is described together with processes for producing useful epipodophyllotoxin derivatives from 4′-demethyl-epipodophyllotoxin.

---

This is a continuation-in-part of our copending application Ser. No. 477,601 filed on Aug. 5, 1965 now abandoned.

The invention relates to the intermediate compound, 4′-demethyl-epipodophyllotoxin of the Formula I,

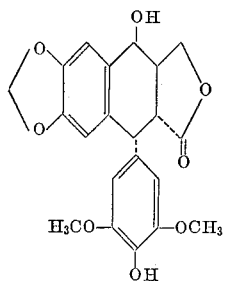

The compound of Formula I may be produced by epimerisation of 4′-demethyl-podophyllotoxin. Thus, for example, the starting material 4′-demethyl-podophyllotoxin is heated together with a strong acid such as hydrochloric acid, sulphonic acid, or trifluoroacetic acid, in a suitable solvent such as a mixture of water and a water miscible organic solvent which will not form ethers with the starting material or end product, e.g. acetone. The reaction is conveniently effected under reflux, or at a temperature between about 20° and 80° C.

The compound of Formula I may be employed for the production of compounds of the Formula II,

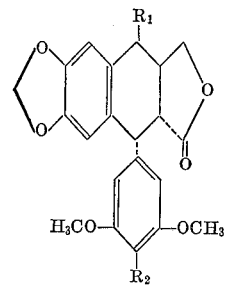

wherein $R_1$ and $R_2$ are —OCOAm, Am being amino, monoalkyl $(C_1-C_4)$-amino, monoacyl $(C_2-C_4)$-amino, phenyl-amino, or benzyl-amino.

A compound of the above Formula II may, for example, be produced by:

(a) reacting the compound of Formula I, at a temperature between —10° and 60° C., with an isocyanate of the Formula III, $$O=C=N-R_3 \qquad (III)$$

wherein $R_3$ is alkyl $(C_1-C_4)$, acyl $(C_2-C_4)$, phenyl, or benzyl, to obtain a compound of the Formula IIa,

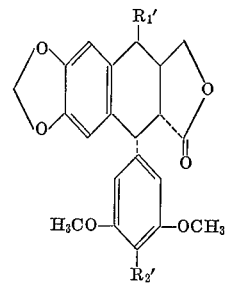

wherein $R_1'$ and $R_2'$ are —OCOAm′, Am′ being monoalkyl $(C_1-C_4)$-amino, monoacyl $(C_1-C_4)$-amino, phenyl-amino, or benzyl-amino; or (b) reacting the compound of Formula I, with a carbamic acid derivative of Formula IV, $$X-CO-Am'' \qquad (IV)$$

wherein

Am″ is amino, nonoalkyl $(C_1-C_4)$-amino, phenyl-amino, or benzyl-amino, and
X is chlorine, bromine, or lower alkoxy, the reaction being carried out under anhydrous conditions in an inert solvent and, when X is chlorine or bromine, in the presence of a tertiary base at a temperature of from about —20° to 60° C. and, when X is lower alkoxy, in the presence of a catalyst in the form of a metal alcoholate at a temperature of from about 40–100° C., to obtain a compound of the Formula IIb,

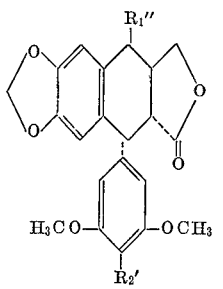

wherein $R_1''$ and $R_2''$ are —OCOAm", Am" having the above significance.

The above process (a) may be carried out by reacting the compound of Formula I with a compound of Formula III in an anhydrous solvent such as pyridine, or methylene chloride, the reaction conveniently being effected at room temperature or a slightly elevated temperature, optionally with the addition of a catalyst. A strong organic acid such as methane- or toluenesulphonic acid, trichloroacetic acid or trifluoroacetic acid is a suitable catalyst.

In the above process (b), where X in the Formula IV is chlorine or bromine, the tertiary base is conveniently pyridine. Where X is lower alkoxy, it is also possible to proceed in such a manner that the compound of Formula I and the alkoxy compound of Formula IV are subjected to an interchange of ester radicals in the presence of a catalyst and in an anhydrous solvent such as benzene. Suitable catalysts are Lewis acids not capable of decomposing the compound of Formula I or final product produced under the prevailing reaction conditions e.g. aluminium alcoholates, such as aluminium-tri-tert-butylate, aluminium-tri-isopropylate, aluminium - tri-ethylate. The lower alcohol liberated during the reaction is advantageously continuously distilled off from the reaction mixture together with the solvent, at a temperature between 60°–100° C.

The compound of Formula I may also be employed for the production of compounds of the Formula V,

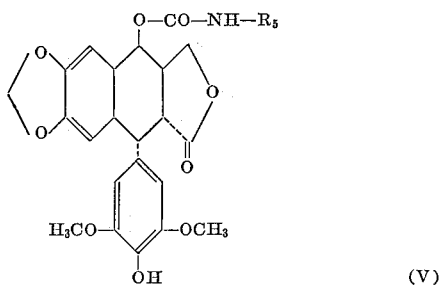

wherein $R_5$ is phenyl.

The compound of the above Formula V may, for example, be produced by:

reacting the compound of Formula I, in an anhydrous organic solvent, under anhydrous conditions, and at a temperature of from about −10° to 60° C., with an isocyanate of the Formula VI, $$R_5—N=C=O \qquad (VI)$$

wherein $R_5$ has the above significance.

Conveniently, this reaction may be effected at room temperature (20° to 35° C.), and 1 to 2.5 moles of the isocyanate may be employed for each mole of the compound of Formula I. Suitable solvents for the process include pyridine and aprotic solvents such as methylene chloride, ethylene chloride, chloroform benzene or chlorobenzene. It is however advantageous to add pyridine to the reaction mixture when an aprotic solvent is employed.

The compounds of Formulae II and V which may be produced from the compound of Formula I are new, and compounds of Formula V form part of the present invention. The compounds of Formulae II and V are useful because they possess cytostatic activity. Such activity is observed by the effect of the compounds on various experimental tumours. In particular, the compound of Formula V has a strong effect against the tumour, leukemia L–1210, good results being obtained at a dosage level of, e.g., 10 mg./kg. of mouse body weight (i.p.). Depending on the compound employed and mode of administration, dosage levels will vary. However, in general satisfactory results are obtained when the compounds are administered enterally or parenterally, preferably in a single daily dose of from about 0.3 mg. to about 7 mg./kg. body weight for mammals.

For such administration the compounds are worked up with pharmaceutically acceptable liquids such as water, alcohols, glycerin and vegetable oils.

Although the $LD_{50}$ values obviously will vary depending upon the particular compound employed, $LD_{50}$ values (mice i.p.) of 100 to 200 mg./kg. and above have been obtained.

The term "in manner known per se" as used herein designates methods in use or described in the literature on the subject.

In the following non-limitative examples all temperatures are indicated in degrees centigrade.

EXAMPLE 1.—4'-dimethyl-epipodophyllotoxin 2 g. of 4'-demethyl-podophyllotoxin are dissolved in 25 ml. of acetone and 15 ml. of water and are heated under reflux for 2 hours after the addition of 5 ml. of concentrated hydrochloric acid. Subsequently the acid is made neutral with solid barium carbonate, filtration is effected and the filtrate is freed from the acetone in a vacuum at 40°. The mixture of the reaction products is taken up in chloroform containiing 5% of acetone and is evaporated in a vacuum after drying over sodium sulphate. The reaction products are separated by chromatography on silica gel. Elution with chloroform containing 1% of methanol yields first small amounts of impurities and then pure 4'-demethyl-epipodophyllotoxin; subsequent elution with the same eluant yields starting material. Crystallization of the pure fractions from chloroform and methanol yields 4'-demethyl-epipodophyllotoxin having a melting point of 228–230°; $[\alpha]_D = -69.8°$ (c.=0.630) in chloroform.

EXAMPLE 2.—1-O-phenylcarbamoyl-4'-demethyl-epipodophyllotoxin

A solution of 400 mg. of 4'-demethyl-epipodophyllotoxin and 0.32 cc. of phenylisocyanate in 3 cc. of absolute pyridine is heated at 40° for 2 hours. 0.5 cc. of absolute methanol are subsequently added to the reaction mixture, the mixture is allowed to react at 20° for 30 minutes and the solution is concentrated by evaporation in a vacuum. The residue is triturated with a small amount of chloroform, the precipitated crystals (mainly diphenyl urea) are filtered off and the filtrate is concentrated by evaporation in a vacuum. The residue is recrystallized from methanol and yields further by-products.

What is claimed is:
1. 4'-demethyl-epipodophyllotoxin.
2. 1-O-phenylcarbamoyl - 4' - demethyl-epipodophyllotoxin.

No references cited.

ALEX MAZEL, Primary Examiner

J. H. TURNIPSEED, Assistant Examiner

U.S. Cl. X.R.

424—282